Nov. 23, 1943.    J. D. HOWELL    2,334,824
LINE TRACING MECHANISM
Filed July 9, 1941    2 Sheets-Sheet 2
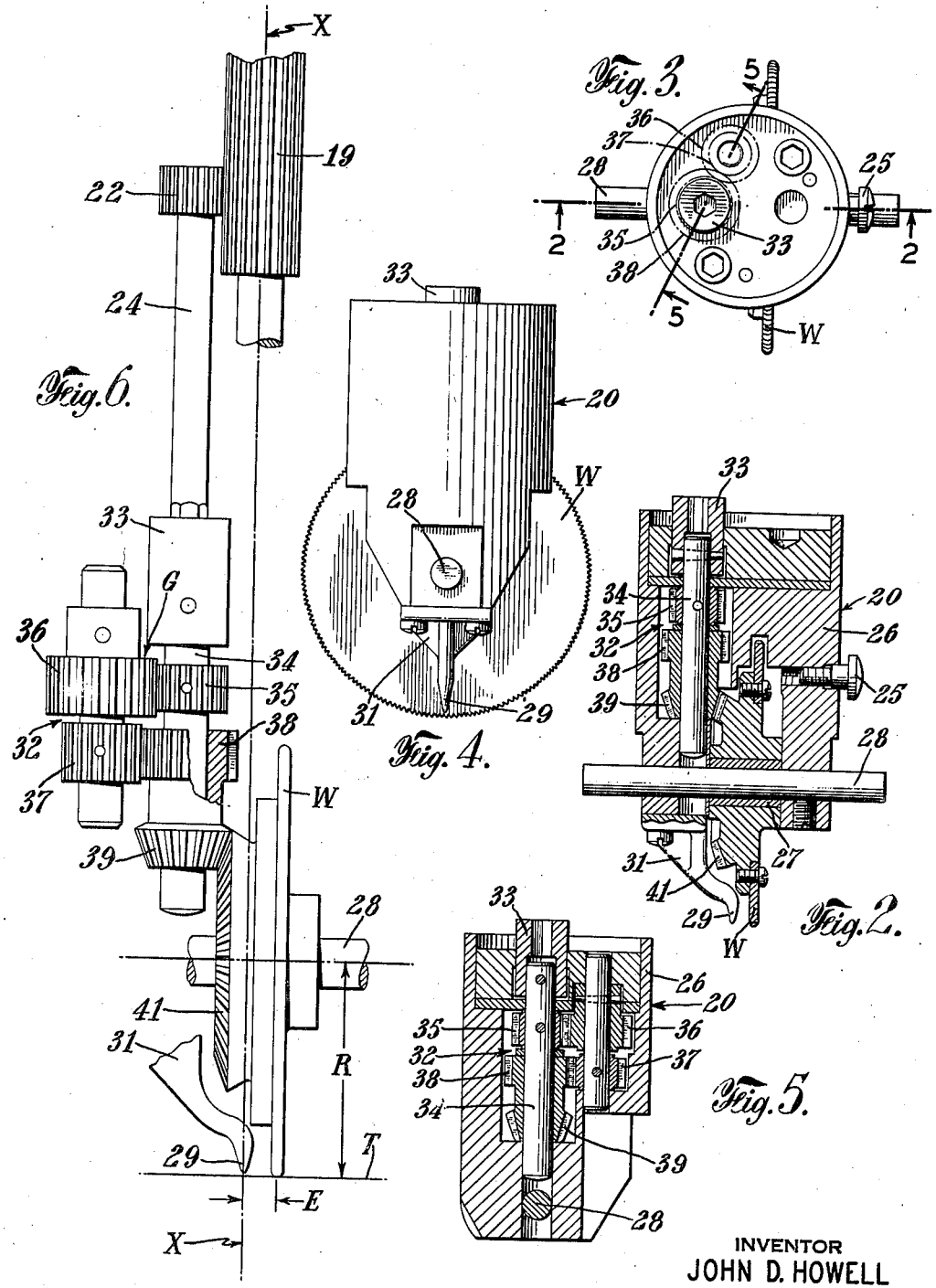
INVENTOR
JOHN D. HOWELL
BY
ATTORNEY Patented Nov. 23, 1943

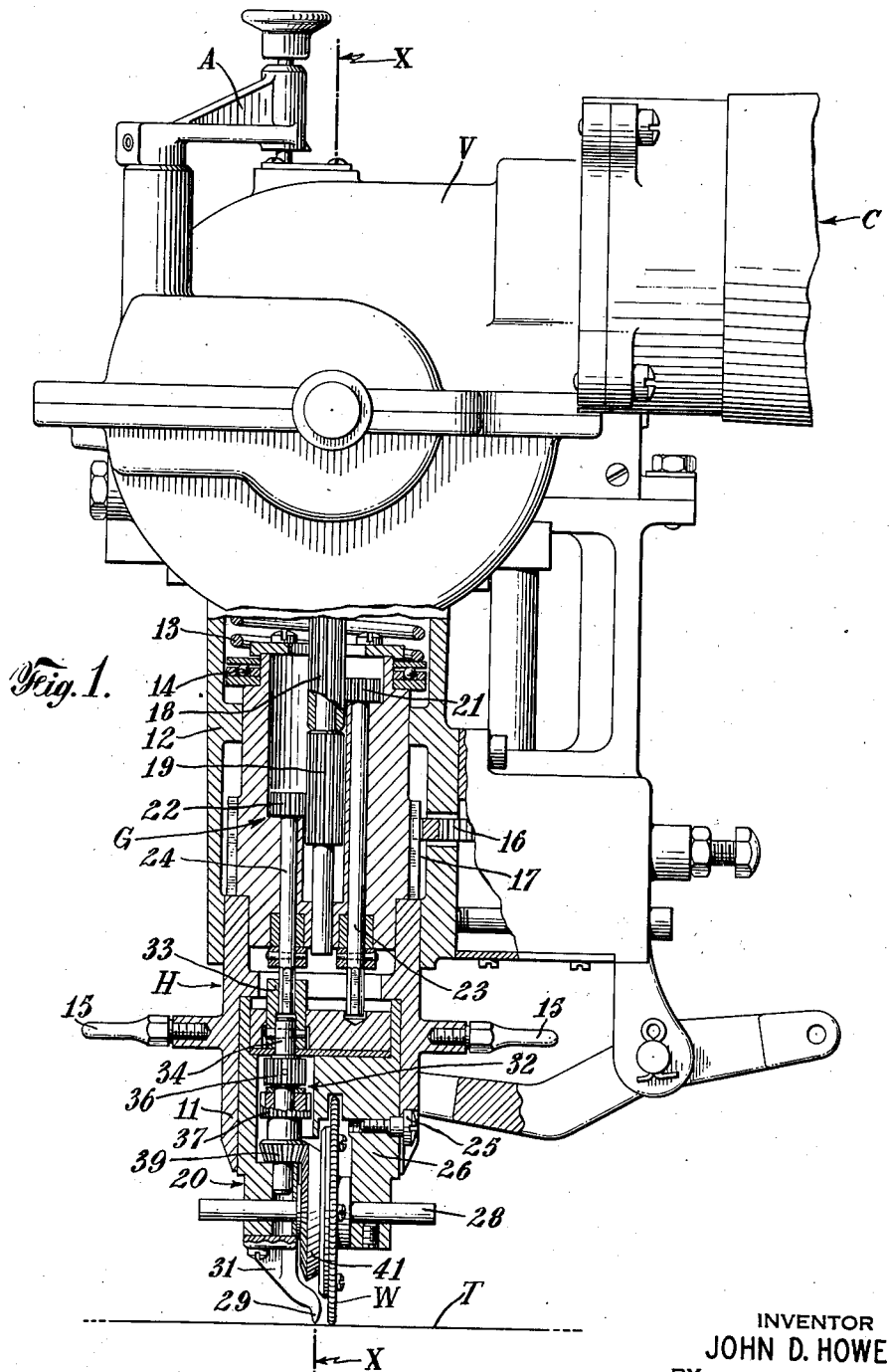

2,334,824

UNITED STATES PATENT OFFICE 2,334,824

LINE TRACING MECHANISM

John D. Howell, Ilion, N. Y., assignor, by mesne assignments, to Union Carbide and Carbon Corporation, a corporation of New York Application July 9, 1941, Serial No. 401,616

8 Claims. (Cl. 33—23)

This invention relates to propelling apparatus and more particularly to a driving unit or tracing head employed in connection with shape-cutting machines.

It is common practice to mount a cutting blowpipe or similar tool upon a supporting carriage for movement in varying directions over a work surface, to reproduce a predetermined contour. A reproducing machine of this type adapted to propel a blowpipe in varying directions is fully disclosed in U. S. Patent to S. R. Oldham, No. 2,279,338 dated April 14, 1942. It is customary with such machines to employ a driving unit which tractionally engages a paper or similar templet mounted on a supporting surface, which driving unit may be guided manually along the prescribed course so as to impart corresponding motion to the blowpipe or other tool.

Since the motion imparted to the carriage is governed by the motion of the axis of the pivotable driving unit or tracing head, it is customary to locate the tracing wheel centrally, so as to engage the templet path at a point coincident with the axis of the tracing head. This has offered substantial disadvantages in operation because the tracing wheel obscures the line drawn on the paper templet during the entire tracing operation, thereby increasing the personal error in the motion of the reproducing tool during hand-guided tracing operations. Furthermore the repeated passage of the tracing wheel over the templet contour effaces the line or path drawn on the templet, thereby involving expensive maintenance work on the part of skilled draftsmen to keep the templets in useful condition. Also, since it is customary to serrate or knurl the periphery of the tracing wheel to obtain better traction, the templet is subjected to abusive treatment each time the wheel traces the contour, so that in a short time the paper is completely worn through. The abrasion is more noticeable at sharp corners because of the scraping and twisting action on the templet whenever the wheel is turned abruptly about the point of rolling contact.

The principal objects of the present invention are: to provide a driving unit for shape-cutting machines, and the like, which unit overcomes the prior art defects enumerated in the preceding paragraph; to provide an improved tracing head which renders the contour line of the templet visible to the operator at all times; to provide an improved tracing head having a tracing wheel which at no time rolls along the contour line of the templet, but yet which allows the tracing head axis to follow the contour line; and to provide an improved tracing head wherein the traction wheel at all times revolves freely in an orbit about the axis of the head. These and other objects of the present invention will become apparent from the following description and from the accompanying drawings disclosing one form of the improved tracing head as applied to a shape-cutting machine of the type disclosed in S. R. Oldham Patent No. 2,279,338. In the drawings:

Fig. 1 comprises a vertical cross-sectional view through the improved tracing head, shown attached to the carriage of a reproducing machine;

Fig. 2 is a vertical sectional view of the tracing-wheel unit, taken on the line 2—2 of Fig. 3;

Fig. 3 is a plan view of the tracing-wheel unit;

Fig. 4 is a side elevational view of the tracing-wheel unit;

Fig. 5 is a sectional view through the gearing, taken on the line 5—5 of Fig. 3; and, Fig. 6 is a diagrammatic view of the entire gearing system employed in the new tracing head.

Generally speaking, the invention comprises a pivotable hand-guided tracing head H adapted to be connected to the universally-movable carriage C of a shape-cutting or similar contouring machine. A traction wheel W, which is offset laterally from the head axis, engages a templet T mounted on a suitable supporting surface. A motor (not shown) mounted on the carriage C provides motive power for the wheel W, the motion being transmitted through a variable-speed transmission V (controlled by a speed adjuster A), and through gearing G.

The head H comprises a housing 11 of generally cylindrical shape journalled to a depending portion 12 of the carriage C for rotation about a central axis X. The head H is urged downwardly into operative engagement with the templet T by means of a compression spring 13 acting through a thrust bearing 14. Spokes 15 projecting radially from the housing 11 serve as a handle to assist the operator in manually pivoting the housing 11, and thereby the entire head H, so as to control the direction of travel of the wheel W. The central axis X of the head H is maintained substantially normal to the operating surface on which the templet T is supported. Ordinarily the templet T is maintained in a horizontal plane and the head H pivots about a vertical axis to impart motion to the carriage C in varying directions in a horizontal plane. Auxiliary steering means comprising a gear 16 cooperative with teeth 17 on the head H permit guiding the head H from a remote point, for example, from a point adjacent to the blowpipe.

A pair of driving pinions 18 and 19 aligned with the axis of the head, are positively rotated in opposite directions by the motor. Planetary pinions 21 and 22 on parallel countershafts 23 and 24 are journalled with respect to the housing 11 in operative engagement with the respective driving pinions 18 and 19. Hence, as the housing pivots about its axis, the planetary pinions revolve in an orbit about the periphery of the sun pinions 18 and 19. Shafts 23 and 24 extend downwardly from the planetary pinions and are provided with flattened portions at their lower end for detachable connection with interchangeable traction-propelling units such as a tracing-wheel unit 20, shown in Fig. 2. The shafts 23 and 24 may engage a pair of spaced trunnions adapted to roll along opposite edges of a raised templet strip, as shown in S. R. Oldham Patent No. 2,279,338. With a hand-guided propelling unit having a traction wheel W, as shown in Figs. 2 and 4, only a single driving connection is necessary. Since both pinions 18 and 19 are positively rotated relatively to the head H, connection to the traction wheel W may be made from either pinion. As shown in Fig. 1, the gearing G, employed to transmit power from the driving pinion to the wheel W, operatively connects with the sun pinion 19.

The tracing-wheel unit 20 disclosed in Figs. 2, 3, and 4 comprises a generally cylindrical mounting, detachably connected, as by a screw 25, within the lower end of the head H. The unit 20 comprises a housing 26 which forms a natural extension of the housing 11 when the parts are assembled. The traction wheel W is journalled to the housing 26 as by a bearing 27 rotatable upon a preferably horizontal spindle 28. As best seen in Fig. 6, the wheel W, having an effective radius R, engages the templet T at a point spaced transversely from the axis of the head H, the point of rolling contact being offset laterally from the axis by the distance E. Accordingly, as the head pivots, the wheel W revolves in an orbit, the diameter of which is twice the distance E. A pointer 29, secured to the housing 26 by a bracket 31, is directed toward and adjacent to the spot on the templet surface intersected by the axis X, and preferably extends in coincident relation to the axis adjacent to the point of rolling contact of the wheel W. The pointer 29 guides the operator during manual steering operations and provides unobstructed vision of the adjoining parts of the contour line. Since the wheel W is mounted eccentrically with respect to the axis of the head H, the wheel W rolls on either side of the contour line, thereby producing no wear on the line itself. This arrangement provides two paths along which the wheel may roll, thereby doubling the useful life of the templets.

As the housing rotates, the wheel W is free to roll in an orbit relatively to the driving mechanism or pinion 19. This action is obtained by selecting gearing G having such a speed ratio between the driving pinion 19 and the wheel W, that as the housing H pivots so as to cause the pinion 22 to revolve in an orbit about the periphery of the sun pinion 19, the wheel W rolls freely in its own orbit about the axis X without slippage on the templet T. With a gear arrangement as disclosed in Fig. 6, the necessary relationship to produce this result is obtained when the speed of gear 19 is related to the speed of wheel W about spindle 28 as the radius of the wheel W is related to the distance E. This same relationship may be established in equation form as follows:

$$\frac{\text{Speed of pinion 19}}{\text{Speed of wheel W}} = \frac{\text{Diameter of wheel W}}{\text{Diameter of wheel orbit}}$$

The gearing G includes a gear train 32, mounted within the housing 26 for connection with the shaft 24 through a coupling 33, pinned to the top end of a shaft 34. The central aperture at the top of coupling 33 is splined or flattened to enter into locking engagement with a similarly shaped portion on the bottom of the shaft 24 whenever the unit 20 slides within the housing H. Speed reduction from the shaft 24 is obtained through gears 35, 36, and 37, which drive a gear 38 and a bevel pinion 39, both of which are journalled as a unit on shaft 34 for rotary movement with respect thereto. The motion of pinion 39 is transmitted to a bevel gear 41 formed integrally with or otherwise secured to the wheel W. Any similar arrangement of transmission mechanism may be employed which allows the wheel W to roll freely about its own axis and in an orbital path about the axis of the head while the gearing or similar mechanism rotates through a corresponding arc while in operative engagement with a fixed axial driving member, such as pinion 19. If the pivoting action occurs while the driving pinion is positively rotated, the total angular velocity of the traction wheel represents the algebraic sum of the normal driving velocity and the increment produced by the planetary action during pivoting of the head. This increment compensates for the larger and smaller path respectively required to be followed by the wheel in tracing outside and inside curves, and maintains the traversing velocity of the pointer constant.

Various modifications of the herein disclosed invention may be made without departing from the principles of the invention or sacrificing its advantages.

I claim:

1. A driving unit for shape-cutting machines, and the like, said unit being adapted to be manually guided in varying directions over a prescribed course located on a supporting surface, said unit comprising a housing manually pivotable about an axis substantially normal to said surface; a traction wheel journalled to the lower part of said housing for driving engagement with said surface at a point spaced transversely from said axis; a positively driven sun pinion coaxially mounted within the upper part of said housing; a planetary pinion in engagement with and revolvable about said sun pinion as said housing pivots; and transmission means extending from said upper part to said lower part of said housing for connecting said planetary pinion and said traction wheel.

2. Propelling apparatus for contouring machines, and the like, adapted to be manually guided about a predetermined course on a supporting surface, said apparatus comprising a housing manually pivotable about an axis extending perpendicularly to said surface; a driving pinion located on said axis; a traction wheel journalled to said housing for rolling engagement with said surface at a point spaced transversely from said axis; and gearing operatively connecting said driving pinion and said traction wheel, said gearing including a planetary pinion rotatably mounted in said housing on an axis parallel to and spaced from said housing axis and thereby adapted when said housing pivots to roll freely about the periphery of said driving pinion through an angle, and to provide free rolling movement of said traction wheel about its orbit through an equal angle.

3. In an axially pivotable tracing head, for shape-cutting machines, and the like, adapted for manual guidance about a predetermined course on a supporting surface, the combination of positively actuated driving mechanism; and a traction wheel positively driven by said driving mechanism and being adapted to engage said surface, said wheel being located in lateral spaced relation to the axis of said head and being free to roll in an orbit about said axis relatively to said driving mechanism; said driving mechanism including an axial drive shaft and a countershaft parallel with said drive shaft and revolvable about said drive shaft through an angle equal to the angle through which said wheel rolls in its orbit.

4. A tracing head adapted to impart movement to a blowpipe-supporting carriage, or the like, in varying directions in a horizontal plane in accordance with a prescribed path located on a horizontal supporting surface, said head comprising a manually pivotable housing adapted to be connected to such carriage for pivotal movement about a vertical axis; a single traction wheel journalled to the lower end of said housing about a generally horizontal axis, said wheel being adapted to engage said surface tractionally to impart movement to said head in a direction governed by the pivotal position of said housing, the point of tractional engagement of said wheel being spaced transversely from said vertical axis; a driving pinion rotatably mounted in the upper part of said housing; a driven pinion rotatably mounted in the upper part of said housing on an axis spaced from the housing axis; transmission means extending from said driven pinion to said traction wheel; and a pointer depending from said housing toward said surface coincident with said housing axis and thereby clearly visible from the axis side of said traction wheel.

5. In a tracing head, manually pivotable about a central axis with respect to a supporting surface, the combination comprising a driving pinion rotatable with respect to said head on said central axis; a traction wheel offset laterally from said central axis and being revolvable in an orbit with said head about said central axis; and gearing including a planetary pinion engageable with and revolvable about the periphery of said driving pinion, said gearing operatively connecting said pinion and said wheel with a speed ratio equal to the ratio between the diameter of said wheel and the diameter of said orbit.

6. A tracing head adapted to be manually guided in varying directions over a prescribed course located on a supporting surface, said head comprising a housing manually pivotable about an axis substantially normal to said surface; a driving member coaxially mounted within said housing; a traction wheel rotatably supported by said housing for driving engagement with said surface at a point spaced from said axis; and transmission mechanism operatively connecting said member and said traction wheel, said transmission mechanism having a speed ratio equal to the ratio between the radius of said traction wheel and the distance separating said point from said axis.

7. A tracing head adapted to impart movement to a blowpipe-supporting carriage, or the like, in varying directions in a horizontal plane in accordance with a prescribed path located on a horizontal supporting surface, said head comprising a manually pivotable housing of generally cylindrical shape adapted to be journalled about a central vertical axis to said carriage; a vertical driving pinion extending within said housing at the top thereof in alignment with said axis; gearing including a planetary pinion journalled within said housing on an axis spaced from and parallel to said central vertical axis for operative engagement with said driving pinion, said planetary pinion thereby being revolvable in an orbit about said driving pinion as said housing pivots; and a traction wheel driven by said gearing, said wheel being journalled to the lower end of said housing about a generally horizontal axis, said wheel being adapted to engage said surface tractionally to impart movement to said head in a direction governed by the pivotal position of said housing, the point of tractional engagement of said wheel with said surface being spaced laterally from said central vertical axis sufficiently that said traction wheel freely rolls in an orbital path about said vertical axis through the same arc as said planetary pinion revolves about said driving pinion when said housing pivots.

8. A manually-guidable tracing head for a shape-cutting or similar machine adapted to impart movement in varying directions in a horizontal plane to a tool-supporting carriage in accordance with a predetermined contour defined on a horizontal supporting surface, said head comprising a manually pivotal housing connected to said carriage for pivotal movement about a vertical axis; a driving pinion coaxial with said head; a traction wheel adapted to engage said surface and to roll along said contour in response to pivoting guiding motion of said head, said wheel being spaced from said axis and being free to roll about an orbit having a radius equal to such spacing at the point of rolling contact; and positive planetary gear mechanism between said axial pinion and said wheel having a gear ratio adapted, when said housing is pivoted so as to rotate said mechanism through any angle about said pinion while said pinion is stationary, to impart positive rolling motion to said traction wheel about its orbit through an equal angle.

JOHN D. HOWELL.